(12) United States Patent
Ziv et al.

(10) Patent No.: US 11,989,615 B2
(45) Date of Patent: May 21, 2024

(54) WIRELESS TAG TESTING

(71) Applicant: Wiliot, Ltd., Caesarea (IL)

(72) Inventors: Dotan Ziv, Tel Aviv (IL); David Lipshitz, Raanana (IL); Ido Geldman, Tel Aviv (IL)

(73) Assignee: WILIOT, LTD., Caesarea (IL)

( * ) Notice: Subject to any disclaimer, the term of this patent is extended or adjusted under 35 U.S.C. 154(b) by 244 days.

(21) Appl. No.: 17/655,642

(22) Filed: Mar. 21, 2022

(65) Prior Publication Data

US 2023/0297793 A1 Sep. 21, 2023

(51) Int. Cl.
*G06K 7/10* (2006.01)
*H04W 4/80* (2018.01)

(52) U.S. Cl.
CPC ..... *G06K 7/10465* (2013.01); *G06K 7/10356* (2013.01); *H04W 4/80* (2018.02); *G06F 2218/00* (2023.01)

(58) Field of Classification Search
CPC .. G06K 7/10465; G06K 7/10356; H04W 4/80
See application file for complete search history.

(56) References Cited

U.S. PATENT DOCUMENTS

| | | | |
|---|---|---|---|
| 5,294,931 A | | 3/1994 | Meier |
| 6,035,677 A | | 3/2000 | Janssen et al. |
| 6,104,291 A | * | 8/2000 | Beauvillier .......... G08B 13/244 340/572.1 |
| 6,184,777 B1 | | 2/2001 | Mejia |
| 6,459,282 B1 | | 10/2002 | Nakamura |
| 6,946,950 B1 | | 9/2005 | Ueno et al. |
| 7,102,517 B2 | | 9/2006 | Reyes et al. |
| 7,164,353 B2 | | 1/2007 | Puleston et al. |
| 7,178,416 B2 | | 2/2007 | Whelan et al. |
| 7,225,992 B2 | | 6/2007 | Forster |
| 7,279,920 B2 | | 10/2007 | Kramer |
| 7,359,823 B2 | * | 4/2008 | Forster ............... G06K 19/0701 702/122 |
| 7,375,636 B1 | * | 5/2008 | Martin ............... G01R 31/2822 340/505 |
| 7,400,255 B2 | * | 7/2008 | Horch ..................... B07C 5/344 340/572.7 |
| 7,411,498 B2 | * | 8/2008 | Forster ............... G06K 7/10465 340/572.1 |
| 7,477,152 B2 | | 1/2009 | Forster |

(Continued)

*Primary Examiner* — Joseph H Feild
*Assistant Examiner* — Albert K. Wong
(74) *Attorney, Agent, or Firm* — M&B IP Analysts, LLC

(57) ABSTRACT

A method for testing a wireless tag by a testing unit. The method comprises: transmitting, by a first antenna, a prescribed pattern that is recognizable by a tag to put the tag into a testing mode; transmitting a trigger signal to a tag from a second antenna, the trigger signal being adapted to cause a tag to at least respond with a prescribed signal when the tag is good; waiting up to a prescribed amount of time after transmission of the trigger signal for a response to the trigger signal from a tag that is within range of the second antenna; when a valid response is received from the tag within the prescribed amount of time, designating the tag as having passed the test; and when a valid response is not received from the tag within the prescribed amount of time, designating the tag as having failed the test.

21 Claims, 8 Drawing Sheets

(56) References Cited

U.S. PATENT DOCUMENTS

| | | | |
|---|---|---|---|
| 7,522,055 B2* | 4/2009 | Carrender | G01R 31/31905 340/572.1 |
| 7,528,712 B2* | 5/2009 | Hong | G06K 7/0008 340/572.1 |
| 7,528,724 B2 | 5/2009 | Horch | |
| 7,604,177 B2 | 10/2009 | Konuma et al. | |
| 7,659,822 B2* | 2/2010 | Carrender | G01R 31/31905 340/572.1 |
| 8,010,219 B2 | 8/2011 | Martinez et al. | |
| 8,552,756 B2* | 10/2013 | Huang | G06K 7/0008 324/762.01 |
| 8,627,170 B2 | 1/2014 | Ito et al. | |
| 8,671,772 B2* | 3/2014 | Jin | G01N 3/20 73/849 |
| 9,016,585 B2 | 4/2015 | Pavate et al. | |
| 9,159,012 B2 | 10/2015 | Downie et al. | |
| 9,432,132 B2 | 8/2016 | Tuominen | |
| 9,824,251 B2* | 11/2017 | Zhao | G06K 7/10366 |
| 10,031,161 B2* | 7/2018 | Li | G01R 31/28 |
| 10,158,401 B2 | 12/2018 | Hull et al. | |
| 10,255,468 B2* | 4/2019 | Forster | G06K 7/10356 |
| 10,539,608 B2* | 1/2020 | Farr | G01R 31/2822 |
| 10,720,036 B2 | 7/2020 | Ellers et al. | |
| 11,036,942 B2* | 6/2021 | Cumby | G06K 7/0095 |
| 2002/0120302 A1 | 8/2002 | Lyden | |
| 2005/0052287 A1 | 3/2005 | Whitesmith et al. | |
| 2005/0242921 A1 | 11/2005 | Zimmerman et al. | |
| 2005/0252979 A1 | 11/2005 | Konuma et al. | |
| 2005/0271416 A1 | 12/2005 | Kinoshita et al. | |
| 2006/0093312 A1 | 5/2006 | Park et al. | |
| 2006/0202831 A1 | 9/2006 | Horch | |
| 2006/0206277 A1 | 9/2006 | Horch | |
| 2007/0213951 A1 | 9/2007 | Eeden | |
| 2007/0220737 A1 | 9/2007 | Stoughton et al. | |
| 2007/0244657 A1* | 10/2007 | Drago | H04B 17/0085 702/81 |
| 2008/0001769 A1* | 1/2008 | Mayer-Zintel | G06K 7/10465 340/653 |
| 2009/0085589 A1 | 4/2009 | Hsieh et al. | |
| 2009/0184165 A1 | 7/2009 | Bertness et al. | |
| 2009/0303008 A1* | 12/2009 | Kang | H04Q 9/00 340/10.1 |
| 2010/0207729 A1 | 8/2010 | Ko et al. | |
| 2010/0214080 A1 | 8/2010 | Alexis | |
| 2011/0052792 A1 | 3/2011 | Shin | |
| 2011/0074582 A1 | 3/2011 | Alexis | |
| 2012/0193433 A1 | 8/2012 | Chang et al. | |
| 2012/0274448 A1 | 11/2012 | Marcus et al. | |
| 2013/0342323 A1 | 12/2013 | Hinman et al. | |
| 2015/0015366 A1 | 1/2015 | Hoffman | |
| 2015/0056918 A1 | 2/2015 | Tuominen | |
| 2016/0284185 A1 | 9/2016 | Maison et al. | |
| 2017/0116443 A1 | 4/2017 | Bolic et al. | |
| 2018/0137316 A1 | 5/2018 | Fischer | |
| 2018/0225486 A1 | 8/2018 | Teruyama | |
| 2018/0341840 A1 | 11/2018 | Jemura et al. | |
| 2019/0118382 A1 | 4/2019 | Gu et al. | |
| 2019/0147646 A1 | 5/2019 | Fan et al. | |
| 2019/0156170 A1 | 5/2019 | Aguirrezabalaga et al. | |

* cited by examiner

WIRELESS TAG TESTING

TECHNICAL FIELD

The present disclosure relates to the testing of wireless tags, such as Bluetooth wireless tags, to ensure that they are not defective and thus suitable for deployment.

BACKGROUND

Testing wireless tags, which is done one wireless tag at a time, is time consuming. Typically, full functionality of the wireless tag, i.e., the full system path of the wireless tag, is tested. Some wireless tags may be designed to harvest electromagnetic energy at one or more frequencies to provide power for their operations. Each such harvesting wireless tag is charged as it arrives at the testing area and then each wireless tag is fully tested. Such testing requires a start and stop process for the conveyance of the wireless tags so that they are in the testing area long enough to be tested.

In various prior art testing arrangements, the testing area may, but need not, be within a chamber that is isolated at least in part from other radio waves. Regardless of whether or not the testing area is a chamber, it is necessary for the wireless tag to be within the testing area of the testing arrangement for a sufficient amount of time to charge and fully test the wireless tag.

Another similar testing regime uses a far field antenna to charge each wireless tag but then each wireless tag is fully tested using a near field antenna. Again, such testing requires a start and stop process for the conveyance of the wireless tags so that each wireless tag is stopped in the testing area of the testing arrangement, and in particular within the range of the near field antenna, for a sufficient amount of time to perform the testing.

A further issue with testing is that some types of wireless tags may be expected to be able to communicate on multiple frequencies. However, before a wireless tag is "converted" it may only be able to communicate on a limited set of the frequencies on which it is expected to ultimately be able to communicate. Conversion is a process by which additional layers are added to the wireless tag which can change the characteristics of the wireless tag's antenna. In view of the foregoing, testing is typically done after conversion and on multiple ones of the wireless tag's expected frequencies of communication.

Prior art wireless tag testing takes hundreds of milliseconds to few seconds per wireless tag. It would be advantageous to provide a solution that speeds up the wireless tag testing property.

SUMMARY

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein include a method for testing a wireless tag by a testing unit. The method comprises: transmitting, by a first antenna of the testing unit, a prescribed pattern that is recognizable by a wireless tag to put the wireless tag into a testing mode; transmitting a trigger signal to a wireless tag from a second antenna of the testing unit, the trigger signal being adapted to cause a wireless tag to at least respond with a prescribed signal when the wireless tag is good; waiting up to a prescribed amount of time after transmission of the trigger signal for a response to the trigger signal from a wireless tag that is within range of the second antenna; when a valid response is received from the wireless tag within the prescribed amount of time, designating the wireless tag as having passed the test; and when a valid response is not received from the wireless tag within the prescribed amount of time, designating the wireless tag as having failed the test.

Certain embodiments disclosed herein also include a method implemented by a wireless tag for use in connection with a tester, the method comprising: entering test mode when a test initiation pattern is detected by the wireless tag in received wireless signals; in response to receiving a trigger signal while in test mode, transmitting a response; and implementing a quiet period for a prescribed time after transmitting the response.

DETAILED DESCRIPTION

Figure 1:
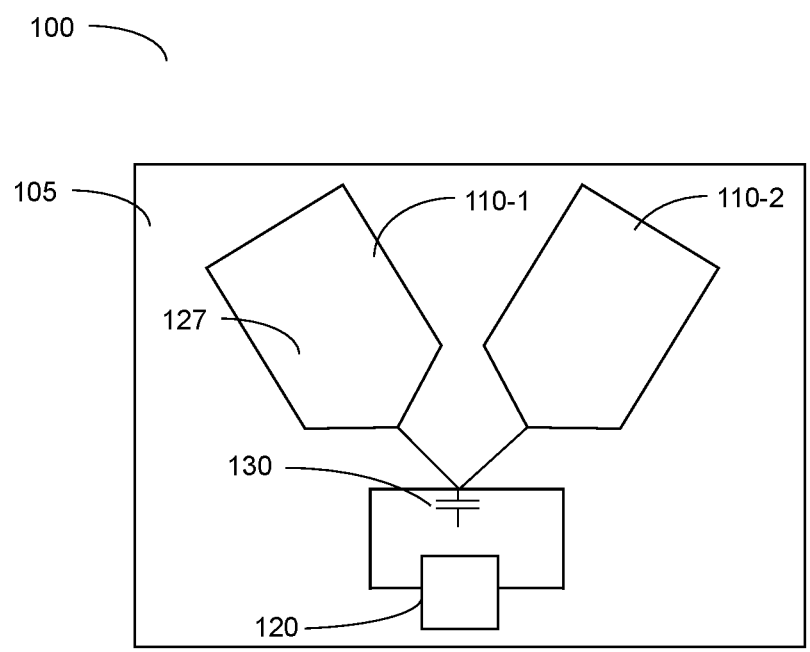
FIG. 1 shows a schematic diagram of an illustrative wireless tag, e.g., an Internet of Things (IoT) wireless tag, that may be utilized with the various embodiments for testing wireless tags.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality.

Unless otherwise explicitly specified herein, the drawings are not drawn to scale.

In the description, identically numbered components within different ones of the FIGS. refer to components that are substantially the same.

Disclosed herein is a method and system for testing a wireless tag by employing an assembly line approach to effectively speed up the testing. Such an approach employs a testing mode that is implemented in the wireless tag. Advantageously, use of the testing mode speeds the testing process. Further advantageously, the testing maybe be performed before the wireless tag is converted with confidence that if the wireless tag passed the test prior to conversion it will function properly after conversion.

More specifically, one or more wireless tags are brought into an operational state of readiness by supplying a specific sequence of signals that are expected to place the wireless tag in the testing mode, wherein the wireless tag is silent and does not respond to most messages until it is taken out of testing mode. As such, the wireless tag waits in testing mode for a trigger that will cause the wireless tag to issue a response indicative of its being in good condition. After transmitting the response, the wireless tag goes into a quiet mode for a prescribed period during which it will not respond to any messages. This affords the opportunity to move the wireless tag out of the range of the signals supplied by the tester, thus ensuring that the wireless tag does not transmit signals that could interfere with the testing of subsequent wireless tags.

In one embodiment, which may be considered the "continuous" embodiment, each wireless tag as it is being conveyed, e.g., by being part of a tape of wireless tags or on a moving belt, is subjected to a prescribed sequence of signals from one or more near field antennas arranged closer to point at which the wireless tag enters the testing area. These signals serve to charge and wake the wireless tag so that the wireless tag performs its internal calibrations which are required to ensure that the wireless tag is properly operational. Thus, these antennas may be considered to be "charging" antennas. These signals also place the wireless tag into testing mode.

Thereafter, closer to the exit of the testing area, a separate near field antenna transmits the trigger and receives the response from the wireless tag, if any. This separate near field antenna may be considered the "testing" antenna. Receipt of a proper response within a prescribed time indicates that the wireless tag is good. Failure to receive a proper response within the prescribed time indicates that the wireless tag is bad. The prescribed time may be based on the location of the testing antenna and the amount of time that the wireless tag is within the tester after transmission of the trigger.

In another embodiment, which may be considered the "matrix" embodiment, a plurality of wireless tags, e.g., arranged as an array, are all moved together into the testing area. A far field antenna transmits a prescribed sequence of signals to charge and wake the wireless tags essentially simultaneously so that each wireless tag of the array performs, substantially in parallel, its internal calibrations which are required to ensure that the wireless tag is properly operational as well as to place it into test mode. Thus, the far field antenna acts as the "charging" antenna.

Thereafter, one or more near field antennas supply the trigger to each wireless tag individually and is used as well to await the wireless tag's response to the trigger. Thus, the one or more near field antennas act as the "testing" antenna. This may be achieved in one embodiment by moving the testing antenna into proximity of each wireless tag individually, e.g., by having the testing antenna be mounted to a robotic arm. In another embodiment, the wireless tags may be moved so that each is individually brought within the near field of the testing antenna. In another embodiment, a combination of moving the at least one testing antenna and moving the at least one wireless tag may be employed.

FIG. 1 is a schematic diagram of illustrative wireless tag 100, e.g., an Internet of Things (IoT) wireless tag, that may be utilized with the various embodiments for testing wireless tags. IoT wireless tag 100 includes an integrated circuit (IC, or chip) 120 and at least one antenna, e.g., antennas 110-1, 110-2, placed on an inlay 105. In an embodiment, the inlay 105 is a single layer inlay that includes the integrated circuit 120 connected to the at least one antenna 110-1, 110-2 and may be mounted on a substrate (not shown). The substrate is a single layer material, which may be a single metal layer or any appropriate integrated circuit mounting material, such as a printed circuit board (PCB), silicon, flexible printed circuits (FPC), low temperature co-fired ceramic (LTCC), polyethylene terephthalate (PET), Polyimide (PI), paper, and the like.

In an example embodiment, IoT wireless tag 100 includes a pair of antennas 110-1 and 110-2 that are etched within the inlay 105. First antenna 110-1 is utilized to harvest energy from ambient RF signals and second antenna 110-2 is utilized to communicate, e.g., transmit and receive, signals, such as Bluetooth Low Energy (BLE) signals. Each antenna 110-1, 110-2 may be of a type including a loop antenna, a big loop with two feeds, a dipole antenna with two transformer feeds, and similar configurations. It should be noted that transmitting second antenna 110-2 may be utilized to harvest energy as well. Further, in some configurations, a plurality of antennas may be used to harvest energy, each of which is designed to receive signals of different frequencies.

In an embodiment, IoT wireless tag 100 also includes capacitor 130 that may be realized as an on-die capacitor, an external passive capacitor, and the like. The energy harvesting functionality and energy use is under the direction of the integrated circuit 120. In another embodiment, IoT wireless tag 100 may include a printed battery.

In order to ensure that IoT wireless tag 100 can operate accurately, the harvesting frequency of harvesting first antenna 110-1 should be tested to determine if it falls within acceptable parameters that enable charging of capacitor 130 within a predetermined timeframe. In an embodiment, the testing requires determining if each individual IoT wireless tag 100 is capable of receiving signals, harvesting energy, charging a capacitor, and sending signals.

Because IoT wireless tag 100 is often configured to operate efficiently using a minimal amount of power available from energy harvesting, the effective operating frequency range of IoT wireless tag 100 is limited. Determining if a wireless tag operates successfully within a set frequency range is crucial in evaluating whether a particular wireless tag is capable of performing as desired.

Harvesting first antenna 110-1 of IoT wireless tag 100 receives energy over RF signals at one or more frequency bands. Such bands are specific to the parameters of that wireless tag, which include, but are not limited to, physical parameters such as antenna length, thickness, conductivity, resistivity, and antenna properties, such as gain, radiation pattern, beam width, polarization, impedance, and the like. It should be noted that even minute differences or shifts between the parameters of two antennas may result in a different harvesting frequency.

Based on the harvesting frequency, harvesting first antenna 110-1 of IoT wireless tag 100 is tuned to a frequency band where the IoT wireless tag can most efficiently receive and transform RF signals received over that band into a DC voltage. In an embodiment, the DC voltage is stored on capacitor 130, or on a similar power storage device.

The energy E on capacitor 130 is related to the DC voltage V by the following equation:

$$E = \frac{1}{2}CV^2,$$

where C is the capacitance of the capacitor. As discussed above, the inlay 105 of IoT wireless tag 100 may include multiple antennas, where more than one antenna may be configured as a separate harvester. In an embodiment, each harvester is connected to a separate storage capacitor, while in a further embodiment, a single storage capacitor is common to multiple harvesters, allowing for an increased shared storage capacity for IoT wireless tag 100.

Bluetooth® and Bluetooth low energy (BLE) are personal area network protocols that support wireless connectivity over the 2.4 GHz industrial, scientific and medical (ISM) band to distances even more than 250 meters. A BLE signal is used with low power consumption devices, such as battery-less wireless tags, e.g., IoT wireless tag 100. Bluetooth and Bluetooth low energy communication operate in far field and their protocol can support multiple connections and multiple device connectivity at the same time. Other low energy communication protocols include LoRa, nRF, DECT® Ultra Low Energy (DECT ULE), Zigbee®, Z-Wave®, EnOcean®, and the like can be used for wireless tags in a similar manner to Bluetooth and BLE. For simplicity and pedagogical purposes, this disclosure may use BLE as an illustrative example, although the disclosure is applicable to wireless tags and testers that employ such other low energy communication protocols.

Some BLE devices may include an Advanced RISC Machines (ARM) processor, e.g., IC 120, with at least one or more antennas, e.g., antennas 110, patterned or designed for transmitting (TX) and receiving (RX) data via radio frequency (RF) communication signals. Additional one or more antennas and other components may be included for use in harvesting energy, e.g., RF energy harvesting, to power the wireless tag's operation. In other configurations, one or more antennas can be used for both harvesting and TX and/or RX. Energy harvesting may allow a wireless tag to operate without requiring a battery source or other external power supply by using over-the-air signals to charge a capacitor.

IC 120 further contains firmware or has access to storage for storing program code and data. Such firmware or program code, hereinafter referred to simply as code, causes IoT wireless tag 100 to operate in a test mode under appropriate circumstances in accordance with the various embodiments disclosed herein.

BLE low-cost devices, e.g., IoT wireless tag 100, are initially implemented as single wireless tags or on reels, very similar to what is commonly used in radio frequency identification (RFID) tags. The BLE wireless tag's substrate are usually made of PET, PI, or other flexible material and each antenna, e.g., antenna 110, is commonly applied/made with copper, aluminum, or silver metals.

Figure 2:
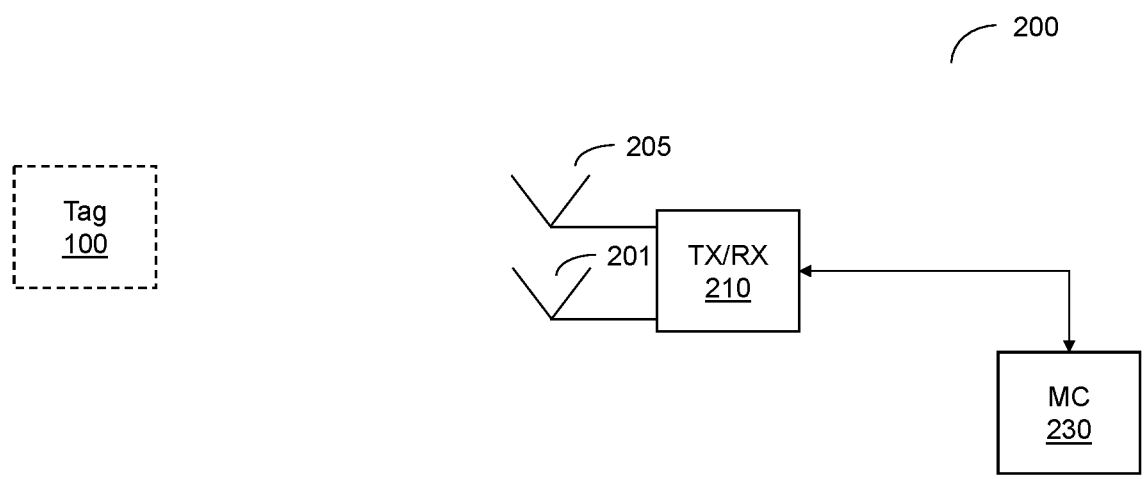
FIG. 2 shows a schematic diagram of a tester configured to test the functionality of a wireless tag, e.g., the IoT wireless tag of FIG. 1, in accordance with an embodiment.

FIG. 2 shows a schematic diagram of tester 200 configured to test the functionality of a wireless tag, e.g., IoT wireless tag 100, in accordance with an embodiment. The tested IoT wireless tags e.g., IoT wireless tag 100, may be battery-free IoT wireless tags which perform energy harvesting, e.g., harvesting energy from wireless signals impacting thereon, as noted above.

Tester 200 is configured to determine if an IoT wireless tag 100 operates as expected and may be integrated within a machine that assembles IoT wireless tags or performs other manufacturing processes thereon. Such assembling and/or manufacturing processes includes metal etching, e.g., copper and aluminum, placing, and attaching the device using Anisotropic Conductive Paste (ACP) to the antennas with the integrated circuits on the inlay of an IoT wireless tag 100, and conversion.

Tester 200 includes transmitter/receiver (TX/RX) 210 connected to antennas 201 and 205. The TX/RX 210 is further connected to microcontroller (MC) 230.

The TX/RX 210 is configured to transmit signals to an IoT wireless tag 100, e.g., via antennas 201 and 205. IoT wireless tag 100 is configured to use at least some of the transmitted signals to charge a capacitor, e.g., capacitor 130, using the harvesting antennas of IoT wireless tag 100. The signals transmitted by TX/RX 210 may include any wireless signals that the wireless tag can receive, and may include wireless signals such as BLE®, FM radio, cellular, Bluetooth®, LoRa, Wi-Fi®, nRF, DECT®, Zigbee®, Z-Wave®, EnOcean®, and the like. In one embodiment, the signals that IoT wireless tag 100 may harvest need not be of the same type that IoT wireless tag 100 uses for communication.

The TX/RX 210 may be configured to transmit multiple different signals, e.g., a BLE signal and an FM radio signal, simultaneously to IoT wireless tag 100, e.g., to charge IoT wireless tag 100 using its various harvesting antennae. Where TX/RX 210 is configured to transmit signals at different bands, TX/RX 210 may operate in accordance with instructions received from microcontroller 230 indicating which type of signal is to be transmitted to IoT wireless tag 100, and the timeframe in which they are transmitted.

IoT wireless tags 100 are manufactured at a mass-production level, thus requiring that the testing of such IoT wireless tags be performed accurately at scale within acceptable time constraints. To this end, in accordance with an embodiment, IoT wireless tag 100 is made to enter a test mode by IC 120 (FIG. 1) under control of its code when it detects a specific pattern of signals or messages that are transmitted by TX/RX 210, e.g., via antenna 201. For example, the pattern may be a plurality of consecutively transmitted BLE AdvEvents. In one embodiment, one or more of the BLE AdvEvents is made up of long beacons. A long beacon is a beacon having a duration, for example, of about 2 milliseconds. Regular, or "short" beacons have a duration of about 300 microseconds. In some embodiments, the particular frequency or a specified ordering of frequencies of the signals may be required for the signals to be recognized as the specific pattern invoking test mode. In other embodiments, specific messages with particular content may be used to indicate that IoT wireless tag 100 should enter test mode.

As is well known, for example, the Bluetooth LE specification divides the communication bandwidth employed into 40 channels of 1 MHz spaced 2 MHz apart starting at 2400 MHz. Of these channels three are called "advertising" channels and are used by devices exclusively to send beaconing packets called advertising packets. These packets contain information that allow other devices to connect and they can also provide information about a device. The advertising channels in BLE are channels 37, 38, and 39, i.e., CH37, CH38, and CH39. In conventional operation, an advertiser transmits three identical ADV_IND BLE packets sequentially over channels CH37, CH38, and CH39. This is called an advertising event which is referred to as advEvent.

In an illustrative embodiment, the specified pattern for entering test mode is three AdvEvents where each AdvEvent is made up of long beacons, one each being on channels 37, 38, and 39, respectively. Thus, there is a sequence of nine ADV_IND BLE packets that cycle through channels CH37, CH38, and CH39.

In one illustrative embodiment, the test mode is attempted to be invoked by having the tester, e.g. tester 200, transmit long beacons sequentially on CH37, CH38, and CH39 for a predefined period of time in an attempt to get the wireless tag being tested to enter test mode. The predefined time may depend on various factors that influence how likely the wireless tag is to receive the long beacons and enter into test mode, such as the distance of the wireless tag at the point they are being tested from the antenna of the tester. For example, the predefined time may range from 10 milliseconds to 2 seconds.

In some embodiments, wireless tags may be put into test mode by a first set of one or more antennas at a first location and then moved to a second location where a second set of one or more antennas provide the trigger and receive the wireless tag response. Such an arrangement may save time because the wireless tag arrives at the trigger location charged, calibrated, and already in test mode. In other embodiments, the wireless tag may pass more sets of antennas transmitting the long beacons prior to arriving at the location of the antennas that transmit the trigger.

The wireless tag measures the time of the beacons to know that they are long beacons as opposed to regular beacons.

Depending on the embodiment, the beacons may or may not have information encoded on them. In one embodiment, the wireless tag may enter test mode simply by recognizing the frequency of a long beacon or the pattern of frequencies of long beacons without needing to obtain any information that may be encoded on any beacon.

As will be readily understood by those of ordinary skill in the art, in order to operate a battery-less wireless tag must be charged, i.e., energized. Even wireless tags with batteries may require some degree of charging, e.g., to provide sufficient power for operation such as when the battery has a small capacity or to recharge the battery. In one illustrative embodiment, energy at around 2480 MHz may be used to energize the wireless tag so that it can operate. In another embodiment with two different harvesters, the energy around 2480 MHz may be used in charging by one harvester and energy around 915 MHz may be used by the other harvester. In some embodiments the transmitted pattern, e.g., the long beacons thereof, may also function to energize the wireless tag.

In one embodiment, a wireless tag must receive at a minimum at least two long beacons on consecutive channels to enter into test mode. Thus, the wireless tag should receive beacons at least sequentially on CH37 and CH38 or sequentially on CH38 and CH39 to enter into test mode. A wireless tag may have an internal clock and can count the frequency that it receives in order to determine which channel is being received. The wireless tag may also determine which channel is received based on a difference between the frequencies of the channels.

In some embodiments, because the wireless tag may be a battery-less, at least sometimes, e.g., every time, during conventional operation, when the wireless tag wakes up, e.g., from a completely off state, the wireless tag must calibrate itself. Thus, when the wireless tag wakes up it may have to perform calibration. This is done typically at least when the wireless tag goes from completely off to on. If the wireless tag was in retention mode, the wireless tag may not need to perform calibration again but instead may employ previously stored calibration values. Nevertheless, the wireless tag may perform calibration periodically to take into account any changes in the environment.

Upon entering test mode, the wireless tag goes into a waiting mode to await a trigger for further operation in test mode. The trigger may be two sequential regular beacons, e.g., regular beacons in a row at least on CH37 and CH38 or in a row on CH38 and CH39. The wireless tag can tell the difference between a long beacon and a regular beacon, as noted above.

In other embodiments, the trigger may be a pattern of messages, e.g., selected by the implementer. In some embodiments, the particular frequency or a specified ordering of frequencies of the messages of the trigger may be required for the messages to be recognized as the trigger.

Upon detecting receipt of the trigger, in one embodiment, the wireless tag is supposed to transmit four prescribed data packets, two at channel 37 (CH37) and two on channel 39 (CH39). In one embodiment it is the same prescribed data packet that is sent four times, two times on channel 37 (CH37) and then two times on channel 39 (CH39). In other embodiments, different data may be sent in response to the trigger.

Generally, so long as a proper expected response is timely received by tester 200 from the IoT wireless tag 100 under test, that IoT wireless tag 100 is considered to be good and it proceeds to the next manufacturing step. However, when a proper expected response is not timely received by tester 200 from the IoT wireless tag 100 under test, the IoT wireless tag 100 is considered to be bad and is slated to be discarded.

It should be appreciated that with regard to certain BLE wireless tags that the wireless tag's transmission antenna may be designed to have its peak sensitivity when converted, i.e., when all of the layers are applied and the wireless tag is complete. Thus, after conversion it is expected that the wireless tag will be able to transmit on both of channels 37 and 39. However before conversion, when all of the layers are not applied to the wireless tag, the transmit frequency of a wireless tag may be higher than after conversion. As such, it cannot be guaranteed that the wireless tag can transmit on channel 37. Similarly, for example, the wireless tags are supposed to work within a specific material that ultimately encapsulates the wireless tag but at this point in the assembly process the wireless tag may be currently exposed at least partly to the air. Therefore, in accordance with an embodiment, so long as the tester receives the packets on CH39 in a timely manner, e.g., about 50 milliseconds, the wireless tag is considered to have passed the test. In the event no response is received, the wireless tag is considered to have failed and will be discarded.

In some embodiments, prior to initiating transmitting on each frequency, the wireless tag may calibrate its transmitter to the particular frequency on which it is going to transmit. This is part of the calibration mentioned hereinabove and must be successfully completed for the wireless tag to be considered operational.

The transmission at both CH37 and CH39 is required since it is not guaranteed that the wireless tag can actually transmit on channel 37 as noted above.

After the wireless tag transmits both on CH37 and CH39 it waits a prescribed amount of time, e.g., 2 seconds, until it self-returns to its regular flow. This provides silence from the wireless tag so that it does not interfere with the testing of the following wireless tags.

Figure 3:
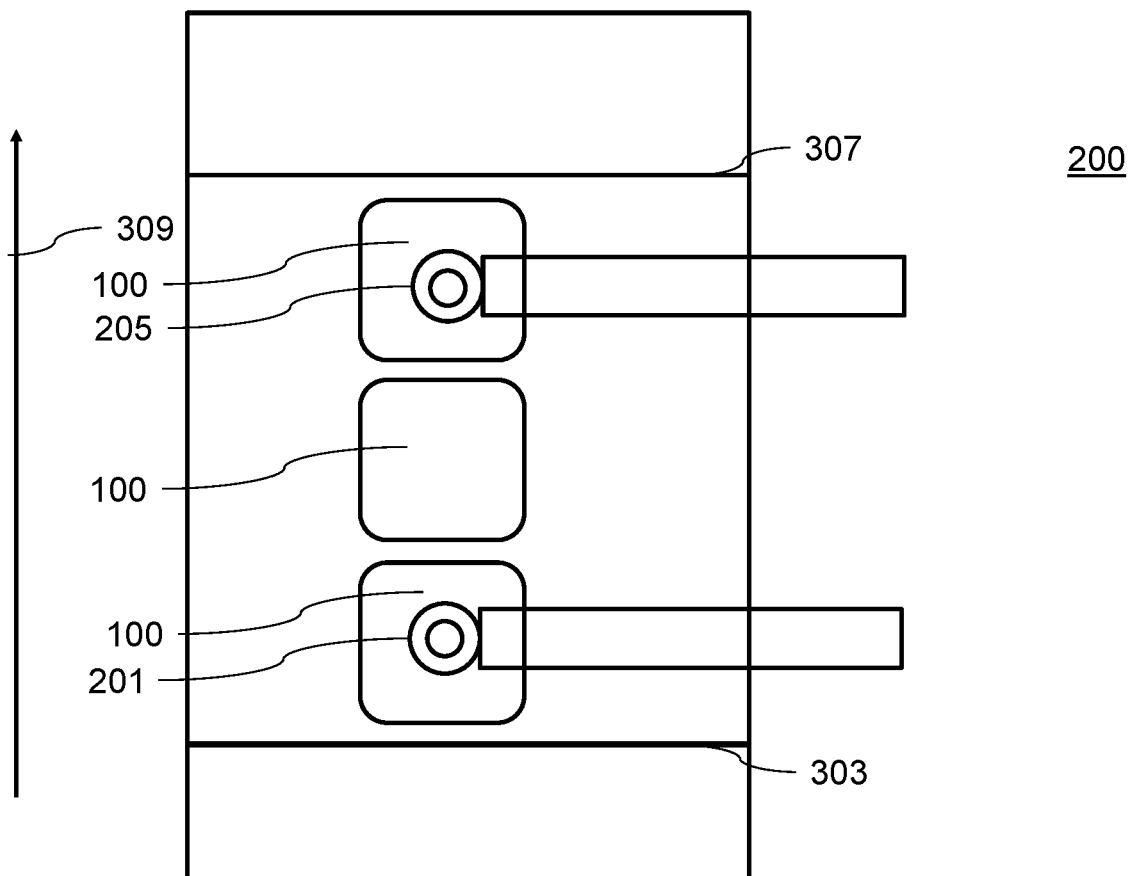
FIG. 3 shows a view of an illustrative embodiment of a tester, e.g., the tester of FIG. 2, in accordance with an embodiment.

FIG. 3 shows a view of an illustrative embodiment of tester 200 in which appropriate signals, e.g., as described above, are transmitted from antenna 201 to cause each IoT wireless tag 100 that passes within range of antenna 201 to enter test mode. In some embodiments, antenna 201 may be a near field antenna. Antenna 201 may be located under or over, IoT wireless tag 100. Near field antenna 201 may both energize and cause IoT 100 to enter test mode.

Each of IoT wireless tags 100 shown in FIG. 3 may be part of a tape or on a belt (not shown) with other wireless tags that are all moving in the direction indicated by arrow 309.

Note that, advantageously, when the testing is being done using the near field, the testing need not be done in a fully shielded environment. Instead, in one embodiment, various shielding portions, which are made of conductive metal, may form a partially closed chamber around near field antennas 201 and 205 in which the testing area is contained. Openings may be made in the chamber formed by the various shielding portions such that radio waves can pass between near field antennas 201 and 205 and IoT wireless tags 100 to which the antennas are transmitting and receiving from. In other embodiments, e.g., where the receipt of the signals from IoT wireless tags 100 by the tester uses a near field antenna, e.g., near field antenna 205, the testing area may simply be an open area and no chamber is required at all. In some embodiments, a conveyor belt, if employed, is not conductive so as to minimize interference of the communication between near field antennas 201 and 205 and each IoT wireless tag 100. A controller (not shown in FIG. 3) may synchronize the movement of IoT wireless tags 100 and the testing process, e.g., the signals transmitted by and expected to be received by near field antennas 201 and 205.

Each IoT wireless tag 100 enters the testing area when it crosses boundary 303 and can thus receive signals from antenna 201 as noted above to be placed in test mode.

As each IoT wireless tag 100 continues to move in the direction indicated by arrow 309, it eventually comes within range of antenna 205, which in this embodiment is also a near field antenna. Antenna 205 issues the trigger and receives the response, if any, from the IoT wireless tag 100 under test, i.e., within range and has not been tested yet and gone into quiet mode, so that tester 200 may determine if IoT wireless tag 100 is good or not as described hereinabove. Each IoT wireless tag 100 continues to move in the direction indicated by arrow 309 after coming into range of antenna 205 so that it passes antenna 205 and by its continuing to move it eventually exits the testing area when it crosses boundary 307. Antenna 205 may be located under or over, IotT wireless tag 100.

In one illustrative embodiment, each of near field antennas 201 and 205 are vertically displaced less than ~3 cm from each IoT wireless tag as they each pass underneath near field antennas 201 and 205. In some embodiments, testing of each IoT wireless tag 100 in the near field of antenna 205 enables prediction of the behavior of IoT wireless tag 100 when deployed in the far field of a unit with which it is to communicate with when deployed in the field. Advantageously, employing test mode and near field antennas avoids neighbor or nearby wireless tags inadvertently also communicating with the tester 300 via antenna 205 and thus avoids interference with the testing.

It may take hundreds of milliseconds to bring a wireless tag up to power and perform a full calibration. In the prior art, disadvantageously, each wireless tag is tested individually and discretely, i.e., one at a time while in the testing area. Each wireless tag would be individually charged and calibrated and then it would be tested by transmitting to it operational signals based on which it was required to transmit expected responses, e.g., using the same antenna for charging and testing.

However, by contrast, advantageously, the arrangement of FIG. 3 allows each IoT wireless tag to first be charged and calibrated as it passes in the region of antenna 201 and then the testing takes place in the region of separate antenna 205. Therefore, so long as sufficient time is allowed in the testing area for an IoT wireless tag to charge and calibrate while it is moving through the testing area from the area of antenna 201 to the area of antenna 205, antenna 205 can perform the testing much more quickly as it receives a charged and calibrated IoT wireless tag in test mode and ready to test. This can reduce the time for testing significantly and effectuates nearly continuous testing. Further advantageously, test mode prevents the wireless tags in the testing area from responding to signals other than the trigger, thus keeping them quiet and ensuring only the wireless tag under test responds to the trigger. Furthermore, after responding to the trigger the wireless tag that was tested goes into quiet mode for a prescribed period of time, e.g., two seconds, thus providing sufficient time for the wireless tag to exit the testing area so that it will not inadvertently respond to messages meant for the next wireless tag or tags under test.

Figure 4:
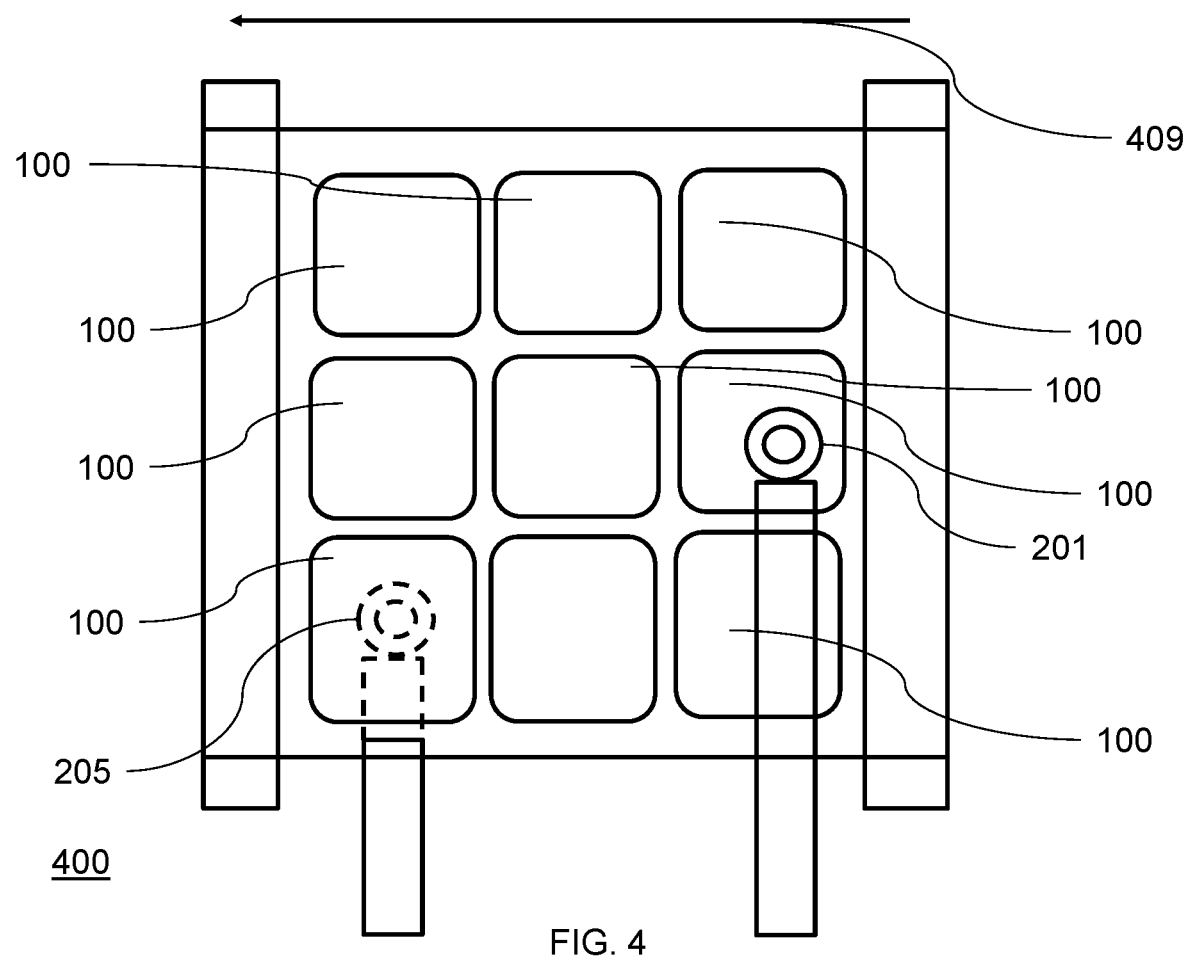
FIG. 4 shows a view of another illustrative embodiment of the tester of FIG. 2.

FIG. 4 shows a view of another illustrative embodiment of tester 200 in which appropriate signals, e.g., as described above, are transmitted from antenna 201 to cause each IoT wireless tag 100 that passes within range of antenna 201 to enter test mode. In this an embodiment, antenna 201 may be a far field antenna. This allows antenna 201 to charge and place multiple IoT wireless tags 100 into testing mode within a time window, which may even be substantially simultaneously, e.g., if the wireless tags are moved into position and then the signals to enter test mode are transmitted from antenna 201. For example, all of IoT wireless tags 100 shown in FIG. 4 in the testing region may be charged and placed in testing mode substantially simultaneously, or at least they are all placed in testing mode as they pass within range of antenna 201. During the testing, antenna 201 may be over or under IotT wireless tags 100.

In the embodiment of FIG. 4, IoT wireless tags 100 are arranged as an array or matrix, and they may be part of a tape or on a belt (not shown) with other IoT wireless tags 100 that are all moving in the direction indicated by arrow 409. The arrangement of the array as well as how many IoT wireless tags may be in the testing area at one time are at the discretion of the implementer.

Figure 5:
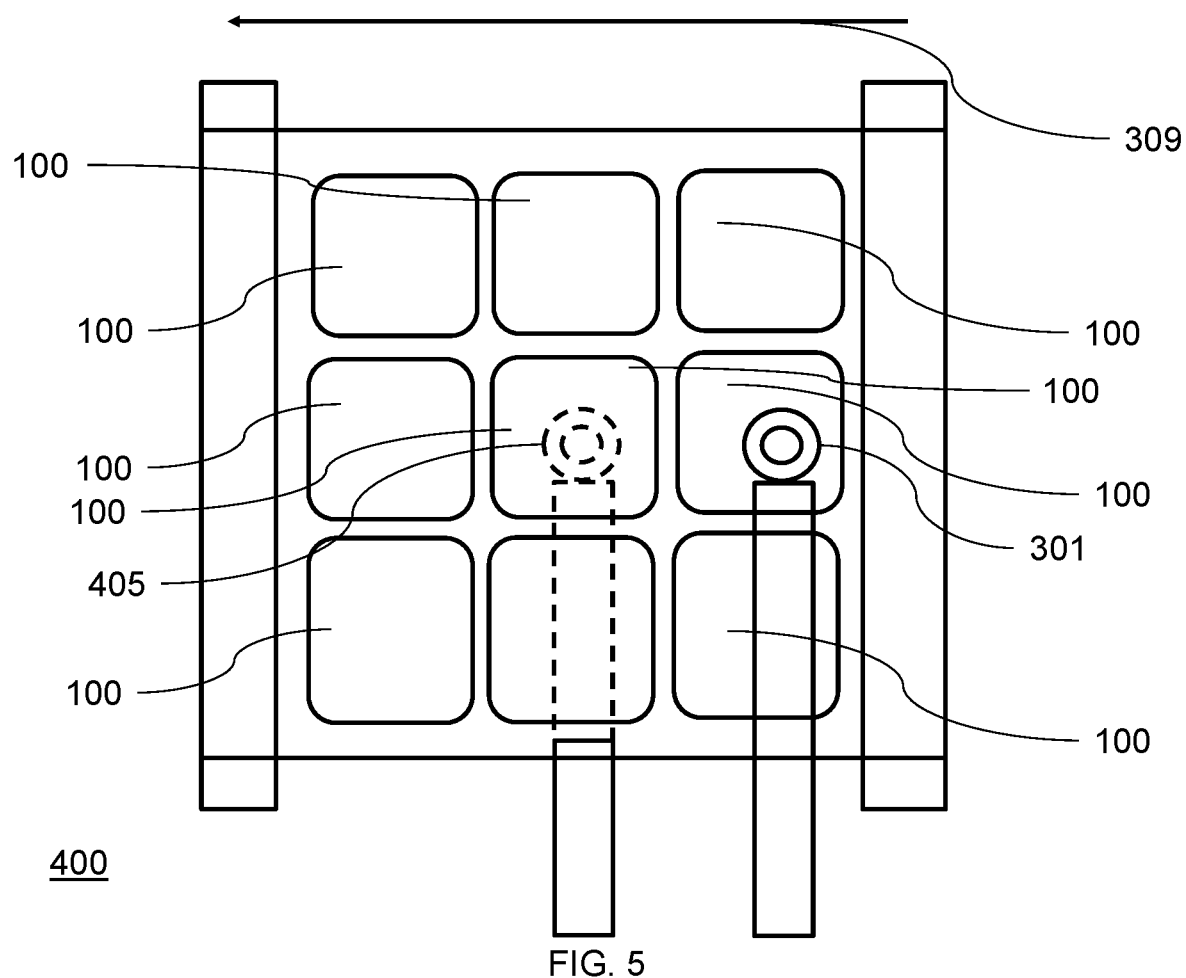
FIG. 5 shows the same embodiment of the tester as is shown in FIG. 4 but with one of its antennas at a different position.

Antenna 205 is a near field antenna that is used for supplying the trigger and receiving the responses from each IoT wireless tag 100. To that end, antenna 205 is moveable and may be relocated within the testing region so as to be positioned within range of each IoT wireless tag 100 being tested. Thus, in FIG. 4, antenna 205 is positioned so as to test the particular IoT wireless tag 100 in the lower left corner of the array of IoT wireless tags 100. In FIG. 5, which shows the same embodiment of tester 200 shown in FIG. 4, antenna 205 is positioned so as to test the particular IoT wireless tag 100 in the center of the array of IoT wireless tags 100.

Antenna 205 may be located on the opposite side of the conveyor belt or tape from antenna 201 to avoid physical interference between the two of them.

In one embodiment, the far field antenna, e.g., antenna 201, does not move and is located "above" the matrix of IoT wireless tags 100 in the middle of the testing area. The near field antenna, e.g., antenna 205, is located on the opposite side from the far field antenna with respect to IoT wireless tags 100, e.g., below the matrix of IoT wireless tags 100, on a moving robotic device so that its location may be changed as described hereinabove.

In accordance with one implementation of the embodiment shown in FIGS. 4 and 5, all of IoT wireless tags 100 may be charged and placed into test mode by antenna 201 after entering the testing area and prior to testing by antenna 205 beginning. This reduces the testing time required to collectively test all of IoT wireless tags 100 within the testing area with respect to the prior art since only one charging time is required for testing all of those IoT wireless tags 100 that are in the testing area as opposed to each IoT wireless tag requiring its own charging time.

In some implementations, antenna 201 may begin transmitting the signals to place IoT tags 100 into testing mode as soon as new IoT tags 100 enter the testing area. This allows IoT tags 100 that are furthest from the entrance to testing area once all IoT wireless tags 100 have entered the testing area to have had the longest time to enter into testing mode. Therefore, it may be advantageous to start testing them with antenna 205 as they are likely to be the ones to complete calibration and enter testing mode first, thus minimizing delay in starting testing. Since the signals to cause entry to test mode are transmitted in a repetitive manner, there is no loss in regard to IoT wireless tags 100 that enter the area later. However, there would be a need to wait for such IoT wireless tags 100 to enter test mode before starting testing.

If the tester receives packets from two different IoT wireless tags 100, it may determine which wireless tag is most likely the one under test using logic incorporated into the controlling software. For example, it may look at the received signal strength indication (RSSI) and determine that the IoT wireless tag 100 with the largest RSSI is the one under test, e.g., when there is a big difference in RSSI values. If it cannot be determined, the tester will fail the IoT wireless tag 100 currently under test.

In another implementation, instead of moving antenna 205, IoT wireless tags 100 may be moved so that each is eventually located within range of antenna 205 to perform the test. Yet in another implementation, both antenna 205 and IoT wireless tags 100 may be moved so that each IoT wireless tag 100 is located within range of antenna 205 to perform the test. In other words, a spatial relationship is arranged between a particular IoT wireless tag 100 under test of IoT wireless tags 100 and the antenna 205, such that the near field transmission from the antenna 205 will be received only by the particular IoT wireless tag under test, the particular IoT wireless tag under test being the wireless tag to which antenna 205 transmits the trigger signal.

Figure 6:
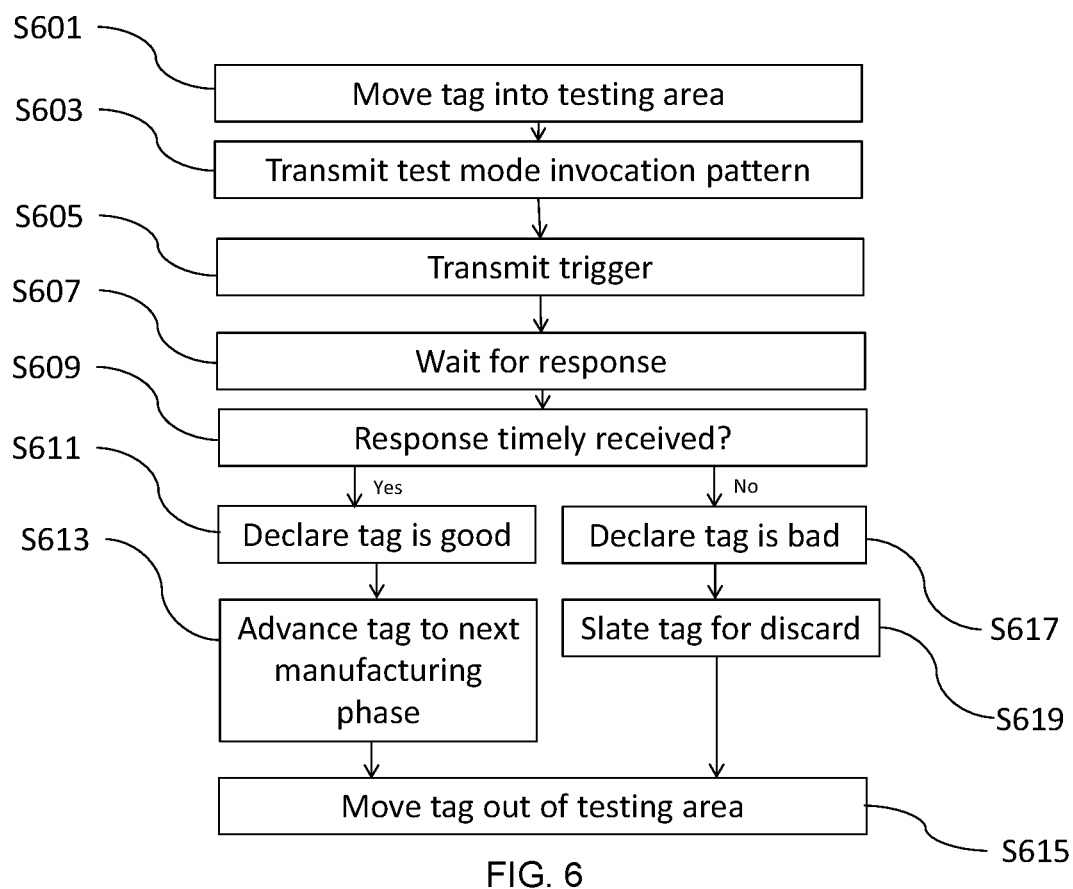
FIG. 6 shows a process in flowchart form for testing a wireless tag by a tester, the process being performed by the tester according to an embodiment.

FIG. 6 shows an illustrative process in flowchart form for testing a wireless tag by a tester, e.g., an embodiment of tester 200, the process being performed by the tester.

The process is entered in S601 when a wireless tag, e.g., IoT wireless tag 100, is moved into the testing area, e.g., within range of the first antenna of the tester. For example, the wireless tag may be brought with range of antenna 201 of tester 200 (FIG. 3). Such may be achieved by moving a conveyor belt or a tape of wireless tags.

Then, in S603, a test mode invocation pattern is transmitted by the tester, e.g., via its first antenna 201. This places a good wireless tag into testing mode. As noted above, for BLE the test mode invocation pattern may be three AdvEvents where each AdvEvent is made up of long beacons, one each being on channels 37, 38, and 39, respectively, e.g., via antenna 205.

Thereafter, in S605, the trigger signal is transmitted from the tester to the wireless tag, e.g., via its second antenna. For example, the wireless tag may be brought with range of antenna 205 of tester 200 (FIG. 3). This may be performed after the wireless tag has moved into range of antenna 205 or by having antenna 205 brought within range of the wireless tag.

Next, the tester waits for a response from the wireless tag in S607, which is to be received via its second antenna, e.g., antenna 205. This waiting is performed until either a response is received from the wireless tag or expiration of a prescribed amount of time.

Conditional branch point 609 tests to determine if a proper response is timely received, i.e., is a valid response received within the prescribed time, e.g., via antenna 205. For a BLE implementation a valid response may be a response on channel 39 and in some situations, a response may be required on channel 37.

If test result in S609 is YES, indicating that a valid response was timely received, control passes to S611 in which the wireless tag is declared to be good. Control then passes to S613 in which the wireless tag is slated for the next manufacturing phase. This may be achieved by marking a record for the wireless tag that is being tested in a memory of the tester. In addition, it is possible that the testing unit has printing capability and may print a visual indication of pass or failure on the wireless tag itself as appropriate and if such is desired. This next phase may be, for example, conversion. Control then passes to S615 and the wireless tag is move out of the testing area.

If test result in S609 is NO, indicating that a valid response was not timely received, control passes to S617 in which the wireless tag is declared to be bad. Control then passes to S619 in which the wireless tag is slated to be discarded. This may be achieved by marking a record for the wireless tag that is being tested in a memory of the tester. Control then passes to S615 and the wireless tag is move out of the testing area.

Figure 7:
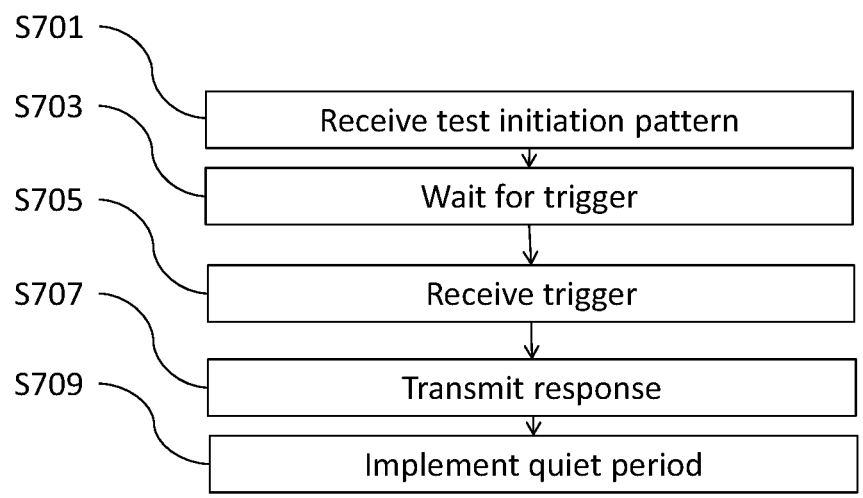
FIG. 7 shows a process in flowchart form that may be performed by a wireless tag undergoing testing by a tester according to an embodiment.

FIG. 7 shows a process in flowchart form to be performed by a wireless tag, e.g., IoT wireless tag 100, undergoing testing by a tester, e.g., tester 200, according to an embodiment.

The process begins in S701 when the wireless tag receives a test mode invocation pattern after having been moved into a testing area by the tester. As noted above, for BLE the test mode invocation pattern may be three AdvEvents where each AdvEvent is made up of long beacons. Next, in S703, the wireless tag performs its calibrations and waits for a trigger signal. As noted above, for BLE the trigger may be a regular AdvEvent, i.e., an AdvEvent made of short beacons.

In S705 the trigger is received by the wireless tag and in response thereto the wireless tag transmits a response in S707. For BLE, the response may be prescribed transmissions on each of CH37 and CH39 as noted above. The process exits at the conclusion of S709 during which the wireless tag implements a quiet period, e.g., for two seconds.

It should be appreciated that those wireless tags which pass the testing and go on for subsequent processing may be tested again by a tester in a similar manner as set forth in hereinabove in connection with FIG. 6. This may be the same tester or a different one. This is done to confirm that the wireless tag is still operational after the subsequent processing.

However, for such subsequent testing a response that is considered proper may be different from that accepted as proper for initial testing. For example, as noted above, during the initial testing even only receiving a response from the wireless tag on CH39 was considered a valid response. However, after subsequent processing, e.g., after conversion, it may be expected that the wireless tag will be able to transmit on CH37 as well. Therefore, a response may be considered proper after conversion only if it is received properly at least on CH37.

Figure 8:
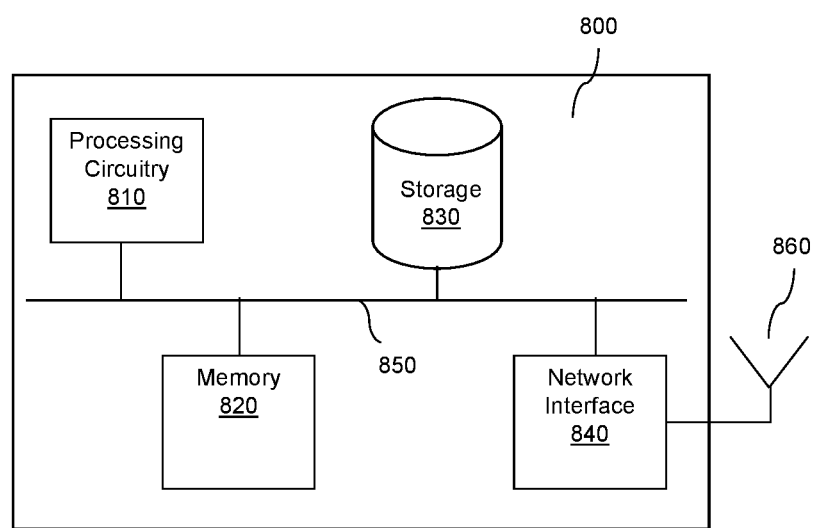
FIG. 8 is a more detailed diagram of an illustrative arrangement that can be used to implement the controller of a tester or of a wireless tag.

FIG. 8 is a more detailed diagram of an illustrative arrangement 800 that can be used to implement the controller of a tester, e.g., MC 230 (FIG. 2) or of a wireless tag, e.g., IC 120 (FIG. 1). Arrangement 800 includes a processing circuitry 810 coupled to memory 820, storage 830, and network interface 840 at least coupled to antenna arrangement 860. In an embodiment, the components of arrangement 800 may be communicatively connected via bus 850.

Processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information. Processing circuitry 810 may implement at least in part integrated circuit 120 (FIG. 1) when the arrangement of FIG. 8 is part of a wireless tag, e.g., wireless tag 100, and MC 230 (FIG. 2) when the arrangement of FIG. 8 is part of a tester.

Memory 820 may be volatile, e.g., RAM, etc., non-volatile, e.g., ROM, flash memory, etc., or a combination thereof. In one configuration, computer readable instructions to implement one or more embodiments disclosed herein may be stored in storage 830.

In another embodiment, memory 820 is configured to store software. Software shall be construed broadly to mean any type of instructions, whether referred to as software, firmware, middleware, microcode, hardware description language, or otherwise. Instructions may include code, e.g., in source code format, binary code format, executable code format, or any other suitable format of code. The instructions, when executed by processing circuitry 810, cause processing circuitry 810 to perform the various processes described herein. Specifically, the instructions, when executed, cause processing circuitry 810 to create, generate, and manage operation of a wireless tag or a tester as described hereinabove.

Storage 830 may be magnetic storage, optical storage, and the like, and may be realized, for example, as flash memory or other memory technology, CD-ROM, Digital Versatile Disks (DVDs), or any other medium which can be used to store the desired information. Storage 830 may be optional.

Network interface 840 allows a tag or a tester, when implemented by arrangement 800, to communicate with other elements, which are external to arrangement 800. Network interface 840 may include a radio frequency module for use in communicating wirelessly via antenna arrangement 860, which may include one or more antennas. Network interface 840 may also interface with other components, e.g., components moving the tags or controlling the position of the tags or to change the location of an antenna, when arrangement 800 is employed to implement a tester.

Antenna arrangement 860 represents whatever antenna architecture is implemented for a wireless tag or a tester. It may be one antenna or more than one antenna, e.g., as described above. Antenna arrangement 860 primarily represents one or more antennas used for wireless communications but it does not preclude using any of its antennas for energy harvesting or to provide energy for energy harvesting. Although not shown in arrangement 800, arrangement 800 may include additional antennas and circuitry for energy harvesting.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software executable on hardware, or any combination thereof. Moreover, the software is preferably implemented as an application program tangibly embodied on a program storage unit or computer readable medium consisting of parts, or of certain devices and/or a combination of devices for execution by hardware. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for testing a wireless tag by a testing unit, comprising:
    transmitting, by a first antenna of the testing unit, a prescribed pattern that is recognizable by a wireless tag to put the wireless tag into a testing mode;
    transmitting a trigger signal to a wireless tag from a second antenna of the testing unit, the trigger signal being adapted to cause a wireless tag to at least respond with a prescribed signal when the wireless tag is good;
    waiting up to a prescribed amount of time after transmission of the trigger signal for a response to the trigger signal from a wireless tag that is within range of the second antenna;
    when a valid response is received from the wireless tag within the prescribed amount of time, designating the wireless tag as having passed the test; and when a valid response is not received from the wireless tag within the prescribed amount of time, designating the wireless tag as having failed the test.

2. The method of claim 1, wherein the first antenna is a far field antenna and the second antenna is a near field antenna.

3. The method of claim 2, further comprising:
prior to transmitting the prescribed pattern, moving a plurality of wireless tags into a testing area of the testing unit within range of the first antenna; and
arranging a spatial relationship between a particular wireless tag of the plurality of wireless tags and the second antenna, such that a near field transmission from the second antenna will be received only by the particular wireless tag, the particular wireless tag being the wireless tag to which the second antenna transmits the trigger signal.

4. The method of claim 3, wherein the spatial relationship between the particular wireless tag of the plurality of wireless tags and the second antenna is achieved by moving at least one of the second antenna, the plurality of wireless tags, and a combination of the second antenna and the plurality of wireless tags.

5. The method of claim 1, wherein the wireless tag is a battery-less wireless tag.

6. The method of claim 1, wherein the wireless tag is a not-fully-completed tag.

7. The method of claim 1, wherein a valid response is a response that is received on a prescribed frequency from the wireless tag that is within range of the second antenna.

8. The method of claim 1, wherein the response is received by the second antenna.

9. The method of claim 1, wherein the first antenna is a near field antenna and the second antenna is a near field antenna.

10. The method of claim 1, further comprising:
moving the wireless tag through a testing area of the testing unit;
wherein the first antenna is located within the testing area at a location closer to a place by which the wireless tag enters the testing area than a location wherein the second antenna is located which is further from the place by which the wireless tag enters the testing area and closer to the place by which the wireless tag exits the testing area; and
wherein the first antenna is a near field antenna and the second antenna is a near field antenna.

11. The method of claim 1, wherein, when the wireless tag is not completed, the response to the trigger signal from the wireless tag is considered a valid response when received at least on prescribed frequency, the prescribed frequency being a frequency for which a signal can be received from the wireless tag even when the wireless tag is not fully completed.

12. The method of claim 1, wherein the response to the trigger signal from the wireless tag is considered a valid response only when received completely as specified.

13. The method of claim 1, wherein the wireless tag is a Bluetooth low energy (BLE) wireless tag and the prescribed pattern is at least a plurality of BLE AdvEvents using long beacons.

14. The method of claim 1, wherein the wireless tag is a Bluetooth low energy (BLE) wireless tag and the trigger signal is two sequential regular BLE beacons.

15. The method of claim 1, wherein the testing unit waits a prescribed time after transmitting the prescribed pattern before transmitting the trigger signal.

16. A method implemented by a wireless tag for use in connection with a tester, comprising:
entering test mode when a test initiation pattern is detected by the wireless tag in received wireless signals;
in response to receiving a trigger signal while in test mode, transmitting a response; and
implementing a quiet period for a prescribed time after transmitting the response.

17. The method of claim 16, wherein the wireless tag is a Bluetooth low energy (BLE) wireless tag and the test initiation pattern is at least a plurality of BLE AdvEvents using long beacons.

18. The method of claim 16, wherein the wireless tag is a Bluetooth low energy (BLE) wireless tag and the trigger signal is two sequential regular BLE beacons.

19. The method of claim 16, wherein the wireless tag is a Bluetooth low energy (BLE) wireless tag and the response is transmission of two packets on channel 37 and two packets on channel 39.

20. The method of claim 16, wherein the prescribed time is a time sufficient for the tester to move the wireless tag out of a testing area of the tester after transmission of the response.

21. A testing machine for testing a wireless tag, the testing machine comprising:
a network interface coupled to a first anntena and a second anntena;
a processing circuitry; and
a memory, the memory containing instructions that, when executed by the processing circuitry, configure a controller to:
transmit, by the first antenna, a prescribed pattern that is recognizable by a tag to put the tag into a testing mode;
transmit a trigger signal to a tag from the second antenna, the trigger signal being adapted to cause a tag to at least respond with a prescribed signal when the tag is good;
wait up to a prescribed amount of time after transmission of the trigger signal for a response to the trigger signal from a tag that is within range of the second antenna;
when a valid response is received from the tag within the prescribed amount of time, designating the tag as having passed the test; and
when a valid response is not received from the tag within the prescribed amount of time, designating the tag as having failed the test.

* * * * *